United States Patent Office 3,755,461
Patented Aug. 28, 1973

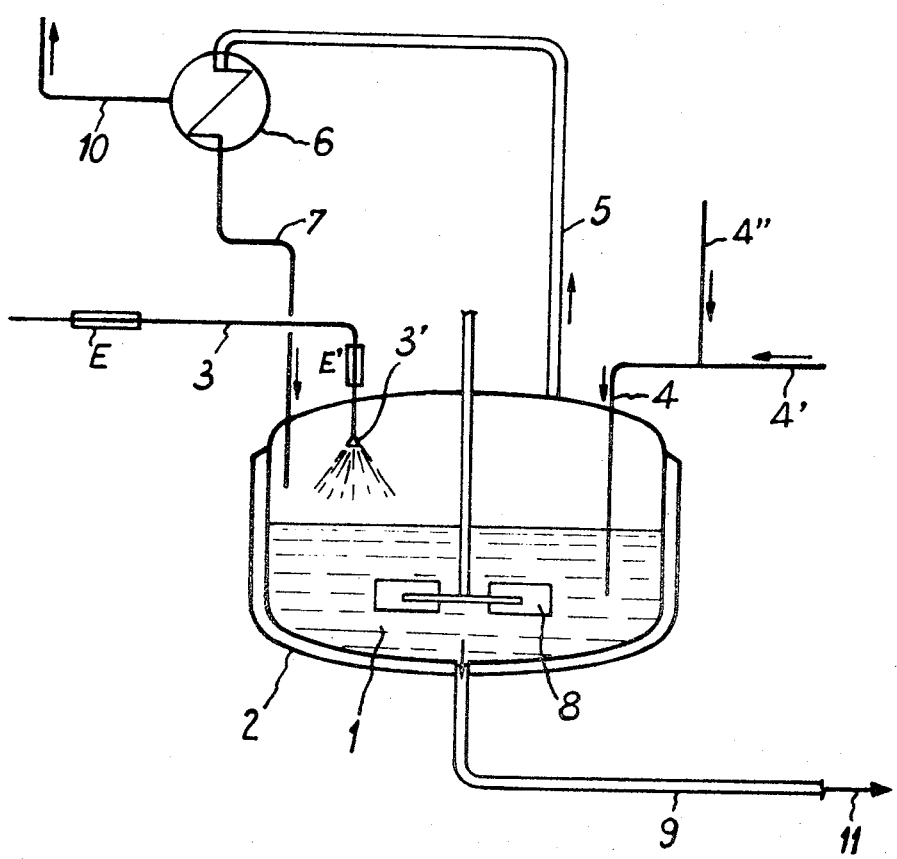

3,755,461
PROCESS FOR THE PRODUCTION OF
ORGANIC DISULPHIDES
Georges Kvasnikoff, Monein, Alain Pfister, Pau, and
Robert Vecchiutti, Jurancon, France, assignors to
Societe Anonyme dite: Societe Nationale des Petroles
D. Aquitaine, Courbevoie, France
Filed Mar. 24, 1972, Ser. No. 237,895
Claims priority, application France, Mar. 29, 1971,
7110938
Int. Cl. C07c *149/12*
U.S. Cl. 260—608                                13 Claims

ABSTRACT OF THE DISCLOSURE

A process for preparing organic disulphides, by oxidizing the corresponding mercaptan with sulphur in the presence of a basic catalyst is characterized by the fact that liquid sulphur is sprayed finely over the surface of a liquid reaction phase, in a reactor equipped with a stirrer, while the liquid mercaptan is injected into this liquid phase which consists of a solution of mercaptan and of disulphide obtained during the reaction, the disulphide obtained in the liquid phase being separated by means known in the previous art. The use of the process to obtain dimethyldisulphide and an apparatus used to perform the process is also described.

---

This invention concerns an improved process for preparing organic disulphides, and more specifically for producing those with the formula R—S—S—R$_1$, where R and R$_1$ are identical or different alkyl or aryl radicals.

In particular, the invention concerns the preparation of dialkyl disulphides containing a variable number of carbon atoms, such as dimethyl, diethyl, dipropyl, dibutyl, dihexyl and dibenzyl disulphides, where either or both R and R$_1$ are CH$_3$, C$_2$H$_5$, C$_3$H$_7$, C$_6$H$_{12}$ or C$_6$H$_6$ radicals. It specially concerns the preparation of dimethyl disulphide.

The invention also concerns a plant for performing this new process.

Organic disulphides are usually prepared by treating the corresponding mercaptans with sulphur; sulphuration takes place with elimination of the hydrogen sulphide, involving the reaction $$2RSH + S \rightarrow R-S-S-R + H_2S \qquad (1)$$

Organic or inorganic basic agents are normally used as catalysts in this process, particularly alkali bases or amines.

This type of process is performed by placing the necessary amounts of solid sulphur, mercaptan and catalyst in a reactor, and heating the reaction mixture to approximately 140° C. The reaction is ended when no further hydrogen sulphide is given off and produces mixtures containing 50% organic disulphides and 50% polysulphides. Part of the mercaptan remains unconverted. In addition, the use of solid elemental sulphur means that production has to be carried out in batches. A few improvements have been made, particularly concerning the quantities of catalyst added, so as to shift the equilibrium of the reaction (1) towards the right.

In order to avoid using solid elemental sulphur, which raises a number of technological problems such as the need for sufficiently high pressure to keep the raw materials liquid when the mercaptans are volatile, it has also been suggested that the mercaptan should be placed in contact, not with solid sulphur, but with sulphur dissolved in a solvent, if possible an organic disulphide, preferably the one being produced. In one recommended embodiment of the process, which particularly concerns the preparation of dimethyl disulphide, the mercaptan for oxidation and the solution of sulphur in disulphide, also containing an amine as catalyst, move in counterflows through a column containing packing material or plates. This produces better results than the process described above, but mercaptan loss remains considerable, and the solution of sulphur in dimethyl disulphide, prepared in advance in a tank, contains not only elemental sulphur dissolved in the dimethyl disulphide, but also polysulphides resulting from reaction between the sulphur and dimethyl disulphide, such as dimethyl trisulphide, dimethyl tetrasulphide and particularly dimethyl pentasulphide. Admittedly, these polysulphides can ultimately be reconverted into dimethyl disulphide by extraction with the methyl mercaptan, but the final product always contains a little pentasulphide. In addition, the process involves technological complications, with the need to install a tank in which sulphur can be dissolved in dimethyl disulphide, and for recycling some of the dimethyl disulphide produced, as a solvent for the sulphur.

The present invention overcomes these various drawbacks, offering a way of obtaining organic disulphides which are free of any other polysulphides, and particularly pentasulphide. It is also simpler to perform than earlier processes.

This new process for preparing organic disulphides from mercaptan and sulphur in the presence of a basic catalyst consists of spraying liquid sulphur finely over the surface of a liquid reaction phase, in a reactor equipped with stirrer, and injecting liquid mercaptan into this liquid phase which consists of a solution of mercaptan and disulphide obtained during the reaction, the disulphide obtained in the liquid phase being separated by means known in the previous art.

To simplify the description of this new process, the example will be taken of the preparation of dimethyl disulphide (DMDS) from methyl mercaptan (MM) and sulphur.

The main reactions that can occur when methyl mercaptan and sulphur are brought into contact are as follows:

(1) $\quad$ 2MM + S $\rightleftarrows$ DMDS + H$_2$S (2) $\quad$ DMDS + S $\longrightarrow$ CH$_3$—S—S—S—CH$_3$ (DMTS)

(3) $\quad$ DMTS + S $\longrightarrow$ CH$_3$(S)$_4$CH$_3$ (DM tetra S)

(4) $\quad$ DM tetra S + S $\longrightarrow$ CH$_3$(S)$_5$CH$_3$ (DMPS)

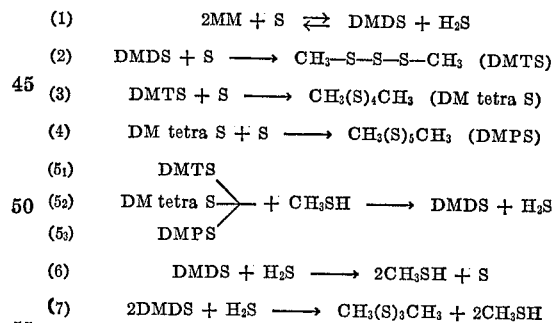

(6) $\quad$ DMDS + H$_2$S $\longrightarrow$ 2CH$_3$SH + S (7) $\quad$ 2DMDS + H$_2$S $\longrightarrow$ CH$_3$(S)$_3$CH$_3$ + 2CH$_3$SH The research that led to discovery of this new way of obtaining a high yield of almost pure dimethyl disulphide, has been based on investigation of these reactions.

In order to obtain dimethyl disulphide, without any other products, reaction 1 has to be encouraged to the maximum, to the detriment of any of the reactions. It is preferable to obtain this objective for the sulphur to be in contact with the liquid methyl mercaptan in a directly reactive form; a fine spray of liquid sulphur meets this requirement. In order to shift reaction 1 to the right, hydrogen sulphide should be eliminated as it forms.

In addition, one of the recommended features of the invention is that the reaction is performed with an excess of mercaptan. Part of the sprayed sulphur probably reacts directly with the methyl mercaptan, in reaction 1, which will also be encouraged by excess mercaptan; it may be assumed that part of the sulphur dissolves in the dimethyl disulphide that forms, giving rise to reactions 2, 3 and 4. Conversion of the products obtained in these reactions into dimethyl disulphide, by means of reactions $5_{1-3}$, will also be encouraged by excess methyl mercaptan. However, these secondary reactions are not noticeable; if they occur, they must be instantaneous. Neither free elemental sulphur nor polysulphide, apart from dimethyl disulphide, are to be found in the reaction mixture. The excess in relation to the stoichiometric quantity of mercaptan needed for reaction 1 can range from 50 to 150%, and is preferably 95 to 105%. It has been found that 100% excess is sufficient to shift the reaction towards the formation of almost pure dimethyl disulphide. The excess methyl mercaptan is recycled.

Compared with earlier processes, in which reactions 2 to 7 could be detected producing undesirable secondary products, the process according to the invention allows dimethyl disulphide to be obtained from methyl mercaptan with secondary reactions reduced to a minimum.

Consequently, the recommended embodiment of the invention consists of producing a reaction between finely sprayed liquid sulphur and excess mercaptan dissolved in disulphide obtained during the reaction, in the presence of about 0.5 to 2% weight of basic catalyst, and of removing the hydrogen sulphide as it forms, together with the stripped mercaptan dissolved in this gas phase.

The sulphur should be added at a temperature between its melting point and 160° C. and preferably between 135 and 145° C.

The mercaptan is added in liquid form, under pressure if necessary. Temperature and pressure conditions in the reactor should be such that the mercaptan remains liquid. Contact between mercaptan and sulphur, and possibly between sulphur and the intermediate products, generally lasts from 5 to 20 minutes, and preferably 10 to 15 minutes. Where methyl mercaptan is oxidized to form dimethyl disulphide, liquid sulphur is added at a temperature of approximately 140° C., and the liquid methyl mercaptan at between 20 and 30° C., and under pressure. The reactor is also kept at a pressure of 3 to 4 bars.

This process is particularly useful when dimethyl disulphide is produced in plants manufacturing liquid sulphur. The installations include a pipe which brings the liquid sulphur directly from the sulphur unit to the dimethyl disulphide unit.

The dimethyl disulphide preparation process according to the invention can be performed in two ways. One consists of a batch reaction. A quantity of liquid methyl mercaptan, containing dissolved trimethyl amine as catalyst, is placed in a reactor, and liquid sulphur is sprayed over the surface of the liquid reaction phase using a jet. There is a 100% excess of mercaptan, over the stoichiometric amount needed for reaction 1. The reaction mixture is stirred for about 10 minutes. There must be a pipe to remove hydrogen sulphide. The mixture contains dimethyl disulphide, the excess mercaptan and a little dissolved hydrogen sulphide. The various ingredients are then separated by means known in the previous art.

The recommended embodiment of the invention, however, is a continuous process for preparing disulphides, particularly dimethyl disulphide. The reagents are fed in continuously, the reaction phase drawn off continuously, and the corresponding flows are calculated so that the ingredients remain in the reactor for 5 to 20 minutes, and preferably 10 to 15 minutes.

The installation according to the invention, for performance of this continuous process, consists of a reactor with stirrer, capable of operating at medium pressure and at the required temperature, which is such that the mercaptan remains liquid at the pressure prevailing in the reactor.

When dimethyl disulphide is being produced, this temperature may be from 30 to 50° C. and the pressure from 3 to 4 bars. The methyl mercaptan, into which a catalyst such as triethyl amine has been injected, is fed continuously into the reactor in liquid form through a submerged pipe, at a temperature of between 20 and 30° C.

The liquid sulphur is injected at a temperature of 140° C., through a pipe which leads into the gas phase inside the reactor. This temperature is maintained by surrounding the pipe with a double casing, inside which superheated steam circulates. The sulphur is sprayed by means of a nozzle into the gas phase inside the reactor; it comes into contact with the liquid phase in a very divided form, and its temperature is reduced from 140° C. to the temperature of the liquid, 30 to 50° C. During cooling this sulphur does not precipitate in a solid state, but disperses in the liquid phase, producing dimethyl disulphide and hydrogen sulphide. The sulphur is also fed continuously into the reactor.

The weight ratio of liquid sulphur to methyl mercaptan is approximately 6. The flows of reagents are calculated to ensure that contact will last about 10 to 15 minutes inside the reactor.

The calories contributed by the sulphur are counterbalanced by evaporation of methyl mercaptan, stripped with the hydrogen sulphide through the reactor air-vent. This gas effluent passes into a cooler where the methyl mercaptan is condensed and returned to the reactor, while the residual gas is evacuated to a burner.

The isothermal nature of the reaction mixture is ensured by cold water circulating round the reactor.

The liquid reaction phase contains 40 to 50% dimethyl disulphide, as well as dissolved methyl mercaptan and hydrogen sulphide, and triethylamine. The liquid is continuously drawn off, the rate being controlled by an automatic level-gauge. The liquid reaction mixture is sent to a series of columns, where the various ingredients are separated, and almost pure dimethyl disulphide is recovered. The methyl mercaptan is returned to the reactor.

The invention is illustrated by, without being confined to, the following description of an installation and method for manufacturing dimethyl disulphide from methyl mercaptan and sulphur.

The accompanying drawing shows the installation in diagrammatic form. The reactor 1 is surrounded by a casing 2, inside which cooling water circulates. There is a liquid sulphur inlet pipe 3, with a nozzle 3' to spray the sulphur, and double casings (E and E') containing superheated steam. The methyl mercaptan is transported through a pipe 4' and the catalyst is transported through a pipe 4" into a common pipe 4', and the gas effluent consisting of hydrogen sulphide and methyl mercaptan is discharged through an outlet pipe 5, to be cooled in a cooler 6. The condensed methyl mercaptan is returned to the reactor through another pipe 7. The reactor is equipped with a stirrer 8. The liquid phase is drawn off continuously through a pipe 9, leading 11 towards the dimethyl disulphide separating and purification columns. The methyl mercaptan is recycled, and the hydrogen sulphide is discharged through another pipe 10 to be burnt off.

The operating conditions for the production of dimethyl disulphide, using an installation similar to the one illustrated, are given below as examples.

EXAMPLE 1

| | |
|---|---:|
| Weight ratio of methyl mercaptan to sulphur | 6 |
| Weight ratio of triethylamine to sulphur | 0.03 |
| Pressure in the reactor _____bars__ | 3.5 |
| Temperature of the liquid phase _____° C__ | 40 |
| Temperature of the liquid phase _____° C__ | 40 |
| Reaction time _____minutes__ | 10 |

The untreated product at the reactor outlet has the following percentage weight composition:

| | |
|---|---:|
| DMDS | 46.8 |
| DMTS | 0.2 |
| Methyl mercaptan | 40.5 |
| $H_2S$ | 12.4 |
| TEA | 0.1 |

EXAMPLE 2

The operating conditions are the same, except that the reaction temperature is 50° C.

The untreated product at the reactor outlet has the following percentage weight composition:

| | |
|---|---|
| DMDS | 47.5 |
| DMTS | Traces |
| MM | 44.8 |
| $H_2S$ | 7 |
| $H_2S$ | 7.6 |
| TEA | 0.1 |

These two examples show that temperature is an important factor in the formation of polysulphides other than dimethyl disulphide. 50° C. is the optimum temperature, with 3.5 bars pressure.

What is claimed is:

1. A process for preparing organic disulphides by oxidizing the corresponding mercaptan with sulphur in the presence of a basic catalyst, characterized by the fact that liquid sulphur is sprayed finely over the surface of a liquid reaction phase while liquid mercaptan is injected into said liquid phase which comprises a soluton of mercaptan and disulphide, and separating the disulphide from said liquid phase.

2. A process according to claim 1, in which hydrogen sulphide produced during the reaction is removed with stripped mercaptan as it forms.

3. A process according to claim 1, in which 50 to 150% excess mercaptan, over the stoichiometric amount, is used.

4. A process according to claim 3, in which 95 to 105% excess mercaptan, over the stoichiometric amount, is used.

5. A process according to claim 1, in which sulphur is added at a temperature between its melting point and 160° C.

6. A process according to claim 5, in which sulphur is added at a temperature of between 135 and 145° C.

7. A process according to claim 1, in which temperature and pressure conditions are such that the mercaptan remains liquid.

8. A process according to claim 1, in which the reagents remain in contact for between 5 and 20 minutes.

9. A process according to claim 8, in which the reagents remain in contact for between 10 and 15 minutes.

10. A process according to claim 1, in which the liquid sulphur and liquid mercaptan are injected continuously and the reaction phase is drawn off continuously, the corresponding flows being controlled such that the reagents remain in the reactor for between 5 and 20 minutes.

11. A process according to claim 10, in which the flows are controlled such that the reagents remain in the reactor for between 10 and 15 minutes.

12. A process for preparing dimethyl disulphide according to claim 1, in which, in a reactor at a pressure of 3 to 4 bars, liquid methyl mercaptan is injected into a liquid phase consisting of methyl mercaptan and dimethyl disulphide obtained during the reaction and with a temperature between 30 and 60° C.

13. A process according to claim 12, in which the liquid phase is kept at a temperature of between 45 and 55° C.

References Cited
UNITED STATES PATENTS

| | | | |
|---|---|---|---|
| 3,340,324 | 9/1967 | Warner | 260—608 |
| 3,314,999 | 4/1967 | Bapseres et al. | 260—608 |
| 3,299,146 | 1/1967 | Gillette et al. | 260—608 |
| 3,277,180 | 10/1966 | Bapseres et al. | 260—608 |

LEWIS GOTTS, Primary Examiner

D. R. PHILLIPS, Assistant Examiner

U.S. Cl. X.R.

23—84